(12) United States Patent
Hunt et al.

(10) Patent No.: US 11,452,259 B2
(45) Date of Patent: Sep. 27, 2022

(54) SYSTEM AND METHOD FOR CONTROLLING HARVESTER IMPLEMENT POSITION OF AN AGRICULTURAL HARVESTER

(71) Applicant: CNH Industrial America LLC, New Holland, PA (US)

(72) Inventors: Cory Douglas Hunt, Millersville, PA (US); Jethro Martin, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 266 days.

(21) Appl. No.: 16/821,313

(22) Filed: Mar. 17, 2020

(65) Prior Publication Data
US 2021/0289703 A1    Sep. 23, 2021

(51) Int. Cl.
*A01D 41/14*    (2006.01)

(52) U.S. Cl.
CPC ......... *A01D 41/141* (2013.01); *A01D 41/145* (2013.01)

(58) Field of Classification Search
CPC ............................ A01D 41/141; A01D 41/145
See application file for complete search history.

(56) References Cited

U.S. PATENT DOCUMENTS

| | | | |
|---|---|---|---|
| 5,978,720 A | 11/1999 | Hieronymus et al. | |
| 6,681,551 B1 | 1/2004 | Sheidler et al. | |
| 6,871,483 B1 | 3/2005 | Panoushek | |
| 10,216,156 B2* | 2/2019 | Enns | A01D 41/141 |
| 2018/0122020 A1 | 5/2018 | Blank et al. | |
| 2019/0261555 A1 | 8/2019 | Baldwin et al. | |
| 2019/0335661 A1 | 11/2019 | Seiders, Jr. | |
| 2019/0335662 A1* | 11/2019 | Good | A01B 79/005 |

FOREIGN PATENT DOCUMENTS

EP    3598886 A1 *    1/2020    ........... A01D 41/141

OTHER PUBLICATIONS

Extended European Search Report for EP Application No. 21162968.8 dated Sep. 3, 2021 (eight pages).

* cited by examiner

*Primary Examiner* — Adam J Behrens
(74) *Attorney, Agent, or Firm* — Peter Zacharias; Patrick Sheldrake

(57) ABSTRACT

A system for controlling harvesting implement position of an agricultural harvester includes a harvesting implement configured to be coupled to the harvester to permit adjustment of a current position of the implement relative to a field surface. Additionally, the system includes a sensor configured to capture data indicative of the current position of the implement relative to the field surface, a display device, and a controller communicatively coupled to the sensor and the display device. As such, the controller is configured to monitor the current position of the implement based on the data captured by the sensor. Furthermore, the controller is further configured to initiate display of a graphical user interface on the display device, with the graphical user interface displaying a first interface element associated with the current position of the implement relative to a second interface element associated with a reference position of the implement.

14 Claims, 5 Drawing Sheets

SYSTEM AND METHOD FOR CONTROLLING HARVESTER IMPLEMENT POSITION OF AN AGRICULTURAL HARVESTER

FIELD OF THE INVENTION

The present disclosure generally relates to agricultural harvesters and, more particularly, to systems and methods for controlling the position of a harvester implement of an agricultural harvester and displaying such position to the operator of the harvester.

BACKGROUND OF THE INVENTION

A harvester is an agricultural machine used to harvest and process crops. For instance, a forage harvester may be used to cut and comminute silage crops, such as grass and corn. Similarly, a combine harvester may be used to harvest grain crops, such as wheat, oats, rye, barely, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects the crop from the field and feeds it to the base harvester for further processing.

Conventionally, the operation of most harvesters requires substantial operational involvement and control by the operator. For example, a combine operator is typically required to control various operating parameters, such as the direction of the combine, the speed of the combine, the height of the combine header, the air flow through the combine cleaning fan, the amount of harvested crop stored on the combine, and/or the like. To address such issues, many current combines use an automatic header height control system that attempts to maintain a constant generally cutting height above the ground regardless of the ground contour or ground position relative to the base combine. For instance, it is known to use various electronically controlled cylinders to automatically adjust the height and position of the header relative to the ground based on sensor measurements received from a plurality of sensors. However, such systems may make it difficult for the operator to determine the current position and/or position of the header during operation of the combine.

Accordingly, an improved system and method for controlling harvester implement position of an agricultural harvester that addresses one or more of the issues identified above would be welcomed in the technology. For example, an improved system and method for controlling harvester implement position of an agricultural harvester and displaying such position to the operator of the harvester would be welcomed in the technology.

SUMMARY OF THE INVENTION

Aspects and advantages of the technology will be set forth in part in the following description, or may be obvious from the description, or may be learned through practice of the technology.

In one aspect, the present subject matter is directed to a system for controlling harvesting implement position of an agricultural harvester. The system includes a harvesting implement configured to be coupled to the agricultural harvester to permit adjustment of a current position of the harvesting implement relative to a field surface. Additionally, the system includes a sensor configured to capture data indicative of the current position of the harvesting implement relative to the field surface, a display device, and a controller communicatively coupled to the sensor and the display device. As such, the controller is configured to monitor the current position of the harvesting implement based on the data captured by the sensor. Furthermore, the controller is further configured to initiate display of a graphical user interface on the display device, with the graphical user interface displaying a first interface element associated with the current position of the harvesting implement relative to a second interface element associated with a reference position of the harvesting implement.

In another aspect, the present subject matter is directed to a method for controlling harvesting implement position of an agricultural harvester. The agricultural harvester, in turn, includes a harvesting implement configured to be coupled to the agricultural harvester to permit adjustment of a current position of the harvesting implement relative to a field surface. The method includes receiving, with one or more computing devices, sensor data indicative of the current position of the harvesting implement. Furthermore, the method includes initiating, with the one or more computing devices, a display of a graphical user interface on a display device based on the received sensor data, with the graphical user interface displaying a first interface element associated with the current position of the harvesting implement relative to a second interface element associated with a reference position of the harvesting implement. Moreover, the method includes controlling, with the one or more computing devices, an operation of a component of the agricultural harvester to adjust the current position of the harvesting implement. Additionally, the method includes initiating, with the one or more computing devices, an adjustment of the positioning of the first interface element relative to the second interface element within the graphical user interface to reflect the adjusted current position of the harvesting implement.

These and other features, aspects and advantages of the present technology will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
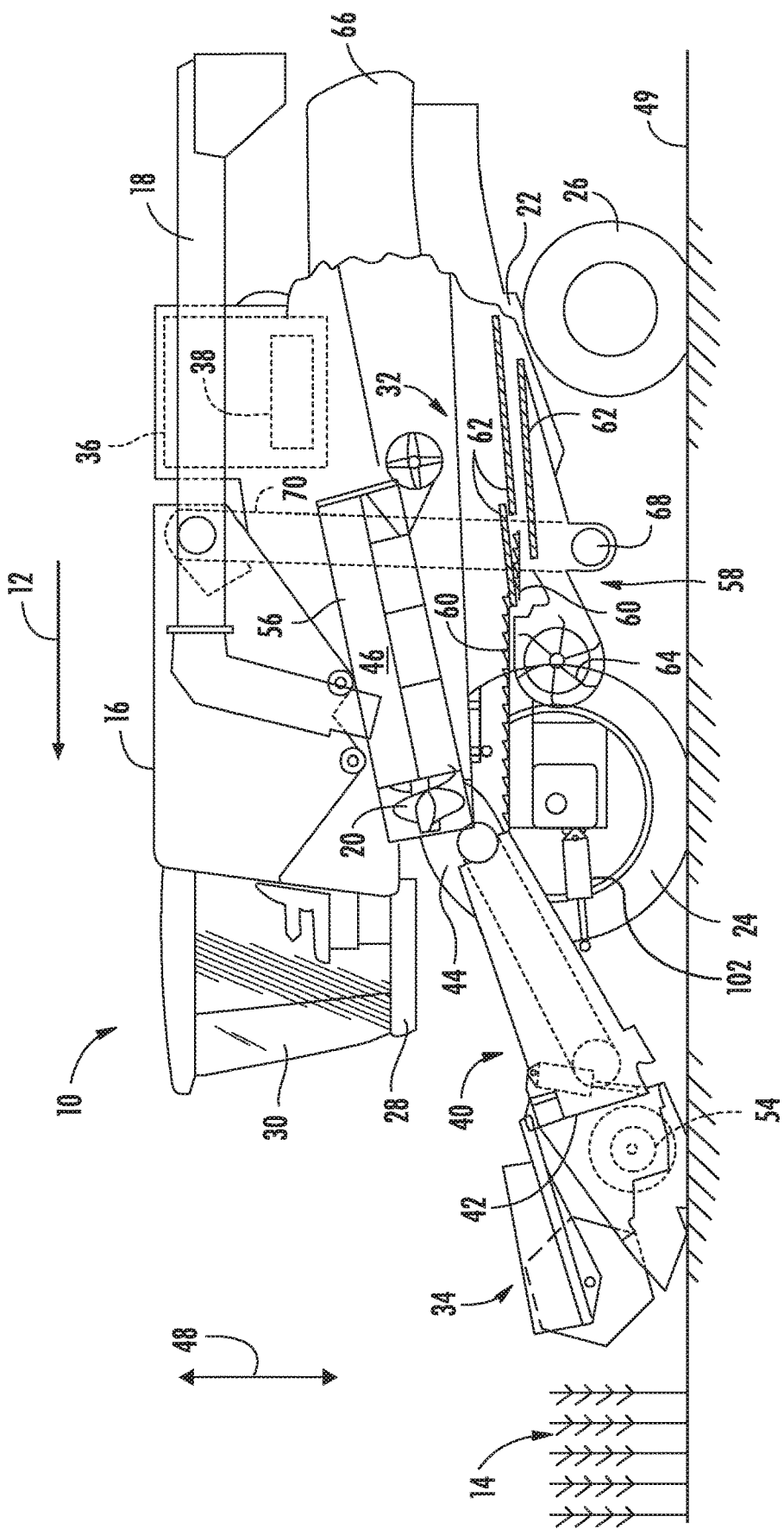
FIG. 1 illustrates a partial sectional side view of one embodiment of an agricultural harvester in accordance with aspects of the present subject matter.

Repeat use of reference characters in the present specification and drawings is intended to represent the same or analogous features or elements of the present technology.

DETAILED DESCRIPTION OF THE DRAWINGS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for controlling harvesting implement position of an agricultural harvester. As will be described below, the present subject matter may be used with a combine or any other suitable agricultural harvester having a header or other harvesting implement for harvesting a crop within a field across which the harvester is traveling. For example, the header may extend in a transverse direction between a first side and a second side. Moreover, the header may extend in a vertical direction between a bottom end and a top end. As such, in several embodiments, the header configured to be coupled to the harvester to permit adjustment of the current position of the header in a plane defined by the transverse and vertical directions.

In accordance with aspects of the present subject matter, the disclosed system may be configured to display a graphical user interface to the operator of the harvester indicating the current position of the header as the header is adjusted during operation of the harvester. In several embodiments, a controller of the system may be configured to receive sensor data indicative of the current position of the header. In this respect, the controller may be configured to initiate a display of the graphical user interface on a display device (e.g., a display screen within the cab) based on the received sensor data. Specifically, the graphical user interface may display a first interface element associated with the current position of the header relative to a second interface element associated with a reference position (e.g., a headlands position) of the header. Furthermore, the controller may be configured to control the operation of one or more actuators of the agricultural harvester to adjust the current position of the header (e.g., within the plane defined by the transverse and vertical direction) to maintain a generally constant cutting height above the field surface as the contour of the field surface changes. Thereafter, the controller may be configured to initiate an adjustment of the positioning of the first interface element relative to the second interface element within the graphical user interface to reflect the adjusted current position of the header.

Referring now to the drawings, FIG. 1 illustrates a partial sectional side view of the agricultural harvester 10. In general, the harvester 10 may be configured to travel across a field in a forward direction of travel (indicated by arrow 12) to harvest a crop 14. While traversing the field, the harvester 10 may be configured to process and store the harvested crop within a crop tank 16 of the harvester 10. Furthermore, the harvested crop may be unloaded from the crop tank 16 for receipt by the crop receiving vehicle (not shown) via a crop discharge tube 18 of the harvester 10. Moreover, as shown, in the illustrated embodiment, the harvester 10 is configured as an axial-flow type combine in which the harvested crop is threshed and separated while being advanced by and along a longitudinally arranged rotor 20. However, in alternative embodiments, the harvester 10 may have any other suitable harvester configuration, such as a traverse-flow type configuration.

The harvester 10 may include a chassis or main frame 22 configured to support and/or couple to various components of the harvester 10. For example, in several embodiments, the harvester 10 may include a pair of driven, front wheels 24 and a pair of steerable, rear wheels 26 coupled to the frame 22. As such, the wheels 24, 26 may be configured to support the harvester 10 relative to the ground and move the harvester 10 in the forward direction of travel 12. Furthermore, the harvester 10 may include an operator's platform 28 having an operator's cab 30, a crop processing system 32, the crop tank 16, and the crop discharge tube 18 that are supported by the frame 22. As will be described below, the crop processing system 32 may be configured to perform various processing operations on the harvested crop as the crop processing system 32 transfers the harvested crop between a harvesting implement of the harvester 10, such as a header 34, and the crop tank 16. Furthermore, the harvester 10 may include an engine 36 and a transmission 38 mounted on the frame 22. The transmission 38 may be operably coupled to the engine 36 and may provide variably adjusted gear ratios for transferring engine power to the wheels 24 via a drive axle assembly (or via axles if multiple drive axles are employed).

Moreover, as shown in FIG. 1, the header 34 and an associated feeder 40 of the crop processing system 32 extend forward of the frame 22 and are pivotably secured thereto for generally vertical movement. In general, the feeder 40 may support the header 34. As shown in FIG. 1, the feeder 40 extend between a front end 42 coupled to the header 34 and a rear end 44 positioned adjacent to a threshing and separating assembly 46 of the crop processing system 32. The rear end 44 of the feeder 40 may, in turn, be pivotably coupled to a portion of the harvester 10. In this respect, the front end 42 of the feeder 40 and, thus, the header 34 may be be moved upward and downward along a vertical direction (indicated by arrow 48) relative to a field surface 49 to maintain a generally constant cutting height above the field surface 49 as the contour of the field surface changes. As such, the harvester 10 may include one or more lift actuators 102 configured to adjust the height of the header 34 relative to the field surface 49.

As the harvester 10 is propelled in the forward direction of travel 12 over the field with the crop 14, the crop material is severed from the stubble by one or more knives (not shown) at the front of the header 34 and delivered by a header auger 54 to the front end 42 of the feeder 40, which supplies the harvested crop to the threshing and separating assembly 46. In general, the threshing and separating assembly 46 may include a cylindrical chamber 56 in which the rotor 20 is rotated to thresh and separate the harvested crop received therein. That is, the harvested crop is rubbed and beaten between the rotor 20 and the inner surfaces of the chamber 56 to loosen and separate the grain, seed, or the like from the straw.

The harvested crop separated by the threshing and separating assembly 46 may fall onto a crop cleaning assembly 58 of the crop processing system 34. In general, the crop cleaning assembly 58 may include a series of pans 60 and associated sieves 62. In general, the separated harvested crop may be spread out via the oscillation of pans 60 and/or sieves 62 and may eventually fall through apertures defined by the sieves 62. Additionally, a cleaning fan 64 may be positioned adjacent to one or more of the sieves 62 to provide an air flow through the sieves 62 that removes chaff and other impurities from the harvested crop. For instance, the fan 64 may blow the impurities off the harvested crop for discharge from the harvester 10 through the outlet of a straw hood 66 positioned at the back end of the harvester 10. The cleaned harvested crop passing through the sieves 62 may then fall into a trough of an auger 68, which may be configured to transfer the harvested crop to an elevator 70 for delivery to the crop tank 16.

Figure 2:
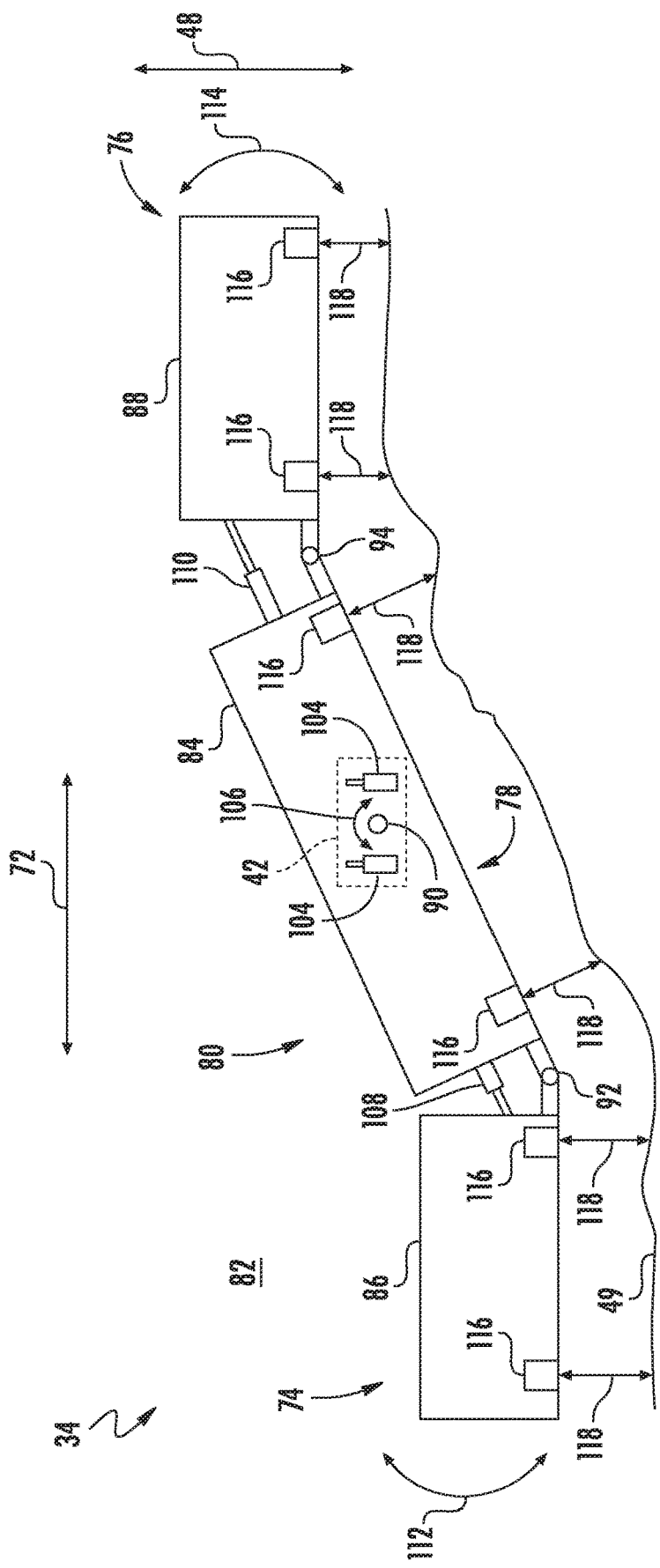
FIG. 2 illustrates a simplified, schematic view of one embodiment of a harvesting implement of an agricultural harvester in accordance with aspects of the present subject matter.

Referring now to FIG. 2, a simplified, schematic view of one embodiment of the header 34 described above with reference to FIG. 1 is illustrated in accordance with aspects of the present subject matter. As shown, the header 34 extends in a transverse direction (indicated by arrow 72) between a first side 74 and a second side 76, with the transverse direction 72 extending perpendicular to the direction of travel 12. Moreover, the header 34 extends in the vertical direction 48 between a bottom end 78 and a top end 80. As will be described below, the header 34 may be coupled to the harvester 10 such that the position of the header 34 relative to the frame 22 of the harvester 10 may be adjusted within a plane 82 defined by the vertical and transverse directions 48, 72 to maintain a generally constant cutting height above the field surface 49 as the contour of the field surface 49 changes.

In several embodiments, the header 34 may include a plurality of header sections 84, 86, 88. For example, as shown in FIG. 2, in the illustrated embodiment, the header 34 include a center section 84, a first wing section 86, and second wing section 88. Specifically, in such an embodiment, the center section 84 may be coupled to the front end 42 of the feeder 40 such that the center section 84 is rotatable relative to the feeder 40 about a longitudinal axis (indicated by circle 90) of the header 34. Furthermore, the first wing section 86 may be pivotably coupled to center section 84 adjacent to the first side 74 at a pivot joint 92. Additionally, the second wing section 88 may be pivotably coupled to center section 84 adjacent to the second side 76 at a pivot joint 94. As such, the positions of header section 84, 86, 88 may be independently adjustable relative to the field surface 49. However, in alternative embodiments, the header 34 may have any other suitable number of sections and/or configuration. For example, in one embodiment, the header 34 may include only a single section fixedly coupled to the front end 42 of the feeder 40 such that the header 34 is only adjustable relative to the harvester chassis 22 in the vertical direction 48 (e.g., via the lift actuator(s) 102).

Moreover, one or more actuators may be configured to adjust the position of the header 34 relative to the harvester frame 22 within the plane 82 defined by the vertical and transverse directions 48, 72 to maintain a generally constant cutting height above the field surface 49 as the contour of the field surface 49 changes. For example, as described above, the harvester 10 may include one or more lift actuator(s) 102 (FIG. 1). Specifically, the lift actuator(s) 102 may be configured to raise and lower the entire header 34 relative chassis 22 to adjust the overall cutting height of the header 34. In addition, as shown in FIG. 2, a pair of tilt actuators 104 are configured to rotate the center section 84 of the header 34 relative to the front end 42 of the feeder 40 in the plane 82 (e.g., as indicated by arrow 106 in FIG. 2). Furthermore, first and second pivot actuators 108, 110 may be respectively coupled between the center section 84 of the header 34 and the first and second sections 86, 88 of the header 34. As such, the first pivot actuator 108 may be configured to pivot the first section 86 of the header 34 relative to the center section 84 of the header 34 about the pivot joint 92 (e.g., as indicated by the arrow 112 in FIG. 2). Similarly, the second pivot actuator 110 may be configured to pivot the second section 88 of the header 34 relative to the center section 84 of the header 34 about the pivot joint 94 (e.g., as indicated by the arrow 114 in FIG. 2). As shown in FIG. 2, such positional adjustments of the header 34 and/or the header sections 84, 86, 88 may allow for a generally constant cutting height when the contour of the field surface 49 changes in the direction of travel 12 and along the transverse direction 72. However, in alternative embodiments, any other suitable actuators may be used to adjust the position of the header 34 to maintain a generally constant cutting height.

The actuators 102, 104, 108, 110 may correspond to any suitable types of actuating devices. For example, in the illustrated embodiment, the actuators 102, 104, 108, 110 correspond to fluid-driven cylinders (e.g., hydraulic or pneumatic cylinders). However, in alternative embodiments, the actuators 102, 104, 108, 110 may correspond to electric linear actuators and/or the like.

In accordance with aspects of the present subject matter, one or more sensors 116 may be installed on the header 34. In general, the sensor(s) 116 may be configured to capture data indicative of the position of the header 34 relative to the field surface 49 as the harvester 10 travels across the field in the forward direction of travel 12. As will be described below, the data captured by the sensor(s) 116 may be used to control the operation of the actuators 102, 104, 108, 110 to maintain a generally constant cutting height the contour of the field surface 49 changes.

In general, the sensor(s) 116 may correspond to any suitable sensing device configured to capture data indicative of the position of the header 34 relative the field surface 49. For example, in several embodiments, sensor(s) 116 may correspond to height sensor(s) configured to data indicative of the distance (indicated by arrows 118) between the header 34 and the field surface 49. In one embodiment, the sensor(s) 116 may correspond to non-contact height sensor(s), such as laser sensor(s), radar sensor(s), ultrasonic sensor(s), and/or the like. Alternatively, the sensor(s) 116 may correspond to contact-based or mechanical height sensors. For instance, in one embodiment, the sensor(s) 116 may be coupled to a mechanical feeler(s) or a pivot arm(s) configured to contact the field surface 49 and pivot up/down with changes in the field surface contour, thereby allowing the sensor(s) 116 to detect variations in the distance 118 between the header 34 and the field surface 49.

Additionally, the header 34 may include any suitable number of sensors 116 and the sensor(s) 116 may be positioned at any suitable location(s) on the header 34. For example, as shown in FIG. 2, in the illustrated embodiment, the center section 84 of the header 34 includes one sensor 116 installed adjacent to the first wing section 86 of the header 34 and another sensor 116 installed adjacent to the second wing section 88 of the header 34. Moreover, the first wing section 86 of the header 34 includes one sensor 116 installed adjacent to the center section 84 of the header 34 and another sensor 116 installed adjacent to the first side 74 of the header 34. Furthermore, the second wing section 88 of the header 34 includes one sensor 116 installed adjacent to the center section 84 of the header 34 and another sensor 116 installed adjacent to the second side 76 of the header 34.

It should be further appreciated that the configuration of the agricultural harvester 10 and the header 34 described above and shown in FIGS. 1 and 2 is provided only to place the present subject matter in an exemplary field of use. Thus, it should be appreciated that the present subject matter may be readily adaptable to any manner of agricultural harvester and/or harvesting implement configuration.

Figure 3:
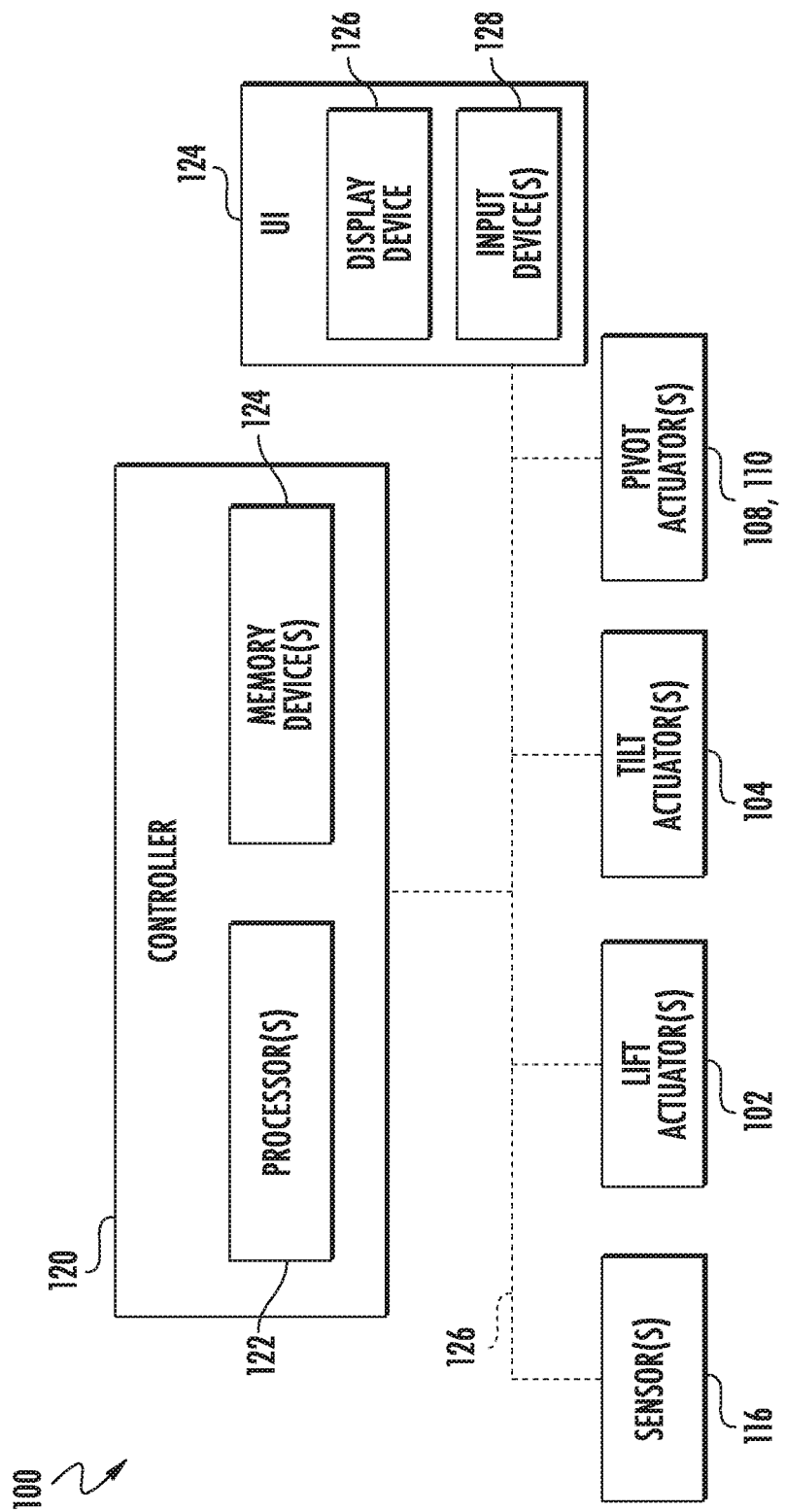
FIG. 3 illustrates a schematic view of one embodiment of a system for controlling harvesting implement position of an agricultural harvester in accordance with aspects of the present subject matter.

Referring now to FIG. 3, a schematic view of one embodiment of a system 100 for controlling harvesting implement position of an agricultural harvester is illustrated in accordance with aspects of the present subject matter. In general, the system 100 will be described herein with reference to the agricultural harvester 10 and the header 34 described above with reference to FIGS. 1 and 2. However, it should be appreciated by those of ordinary skill in the art that the disclosed system 100 may generally be utilized with agricultural harvesters having any other suitable harvester configuration and/or harvesting implements having any other suitable implement configuration.

As shown in FIG. 3, the system 100 may include a controller 120 positioned on and/or within or otherwise associated with the agricultural harvester 10. In general, the controller 120 may comprise any suitable processor-based device known in the art, such as a computing device or any suitable combination of computing devices. Thus, in several embodiments, the controller 120 may include one or more processor(s) 122 and associated memory device(s) 124 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 124 of the controller 120 may generally comprise memory element(s) including, but not limited to, a computer readable medium (e.g., random access memory (RAM)), a computer readable non-volatile medium (e.g., a flash memory), a floppy disc, a compact disc-read only memory (CD-ROM), a magneto-optical disc (MOD), a digital versatile disc (DVD), and/or other suitable memory elements. Such memory device(s) 124 may generally be configured to store suitable computer-readable instructions that, when implemented by the processor(s) 122, configure the controller 120 to perform various computer-implemented functions.

In addition, the controller 120 may also include various other suitable components, such as a communications circuit or module, a network interface, one or more input/output channels, a data/control bus and/or the like, to allow controller 120 to be communicatively coupled to any of the various other system components described herein (e.g., the actuators 102, 104, 108, 110 and the sensor(s) 116). For instance, as shown in FIG. 3, a communicative link or interface 126 (e.g., a data bus) may be provided between the controller 120 and the components 102, 104, 108, 110, 116 to allow the controller 120 to communicate with such components 102, 104, 108, 110, 116 via any suitable communications protocol (e.g., CANBUS).

The controller 120 may correspond to an existing controller(s) of the agricultural harvester 10, itself, or the controller 120 may correspond to a separate processing device. For instance, in one embodiment, the controller 120 may form all or part of a separate plug-in module that may be installed in association with the agricultural harvester 10 to allow for the disclosed systems to be implemented without requiring additional software to be uploaded onto existing control devices of the implement agricultural harvester 10.

Moreover, the functions of the controller 120 may be performed by a single processor-based device or may be distributed across any number of processor-based devices, in which instance such devices may be considered to form part of the controller 120. For instance, the functions of the controller 120 may be distributed across multiple application-specific controllers, such as a navigation controller, an engine controller, an implement controller, and/or the like.

Furthermore, in one embodiment, the system 100 may also include a user interface 124. More specifically, as will be described below, the user interface 124 may be configured to display a graphical user interface to the operator of the harvester 10 indicating the current position of the header 34 as the header 34 is adjusted during operation of the harvester 10. As such, the user interface 124 may include one or more display screens or display devices (e.g., an LCD screen(s)) configured to display a graphical user interface. In this respect, the user interface 124 may be communicatively coupled to the controller 120 via the communicative link 126 to permit the data associated with the graphical user interface to be transmitted from the controller 120 to the user interface 124. In some embodiments, the user interface 124 may also include other feedback devices (not shown), such as speakers, warning lights, and/or the like, configured to provide additional feedback from the controller 120 to the operator. In addition, the user interface 124 may include one or more input devices 128, such as touchscreens, keypads, touchpads, knobs, buttons, sliders, switches, mice, microphones, and/or the like, which are configured to receive user inputs from the operator. In one embodiment, the user interface 124 may be mounted or otherwise positioned within the operator's cab 30 of the harvester 10. However, in alternative embodiments, the user interface 124 may mounted at any other suitable location.

In several embodiments, the controller 120 may be configured to monitor the current position of a harvesting implement, such as the header 34, of the harvester 10. As described above, the header 34 may include one or more sensors 116 configured to capture data indicative of the position of the header 34 relative to the field surface. In this respect, as the harvester 10 travels across the field in the forward direction of travel 12 to perform a harvesting operation, the controller 120 may be configured to receive the captured data from the sensor(s) 116 (e.g., via the communicative link 126). Thereafter, the controller 120 may be configured to process/analyze the received sensor data to determine the position of the header 34 relative to the field surface. For instance, the controller 120 may include a look-up table(s) and/or suitable mathematical formula stored within its memory device(s) 124 that correlates the received sensor data to the position of the header 32.

As used herein, the "position" of the header 34 relative to the field surface my correspond to any positional relationship between the header 34 and the field surface. For example, as described above, in several embodiments, the header 34 may be adjustable within a plane 84 (FIG. 2) defined by the vertical and transverse directions 48, 72. In such embodiments, the position of the header 34 may correspond to the distance between the header 34 and the field surface in the vertical direction 48 and/or the rotation/orientation of the header 34 in the plane 84 relative to the field surface. However, in alternative embodiments, the position of the header 34 may correspond to any other suitable positional relationship, such as the fore-aft tilt angle.

In accordance with aspects of the present subject matter, the controller 120 may be configured to display of a graphical user interface on the display device 126 of the user interface 124. In general, the graphical user interface may provide a visual indication of the current position of the header 34 (as determined by the received sensor data) relative to a reference position, such as the headlands position of the header 34, to the operator of the harvester 10. Specifically, in several embodiments, the graphical user interface may display a first interface element (e.g., one or more lines) associated with the current position of the header 32 relative to a second interface element (e.g., one or more lines) associated with the reference position of the header 32. In this respect, the position of the first interface element on the graphical user interface relative the second interface element may provide the operator an indication of the current position of the header 34 relative to the reference position of the header 34. For example, in one embodiment, the position of the first interface element on the graphical user interface relative the second interface element may provide the operator an indication of the current position of the header 34 relative to the reference position of the header 34 in the plane 84 (FIG. 2) defined by the vertical and transverse directions 48, 72. As will be described below, the position of the first interface element within the graphical user interface may be adjusted as the current position of the header 34 changes during the harvesting operation.

Furthermore, the first and second interface elements may include various interface element portions. As described above, in some embodiments, the header 34 may include one or more header sections (e.g., the header sections 84, 86, 88) that are independently adjustable relative to the field surface. In such embodiments, the first interface element may include a plurality of first interface element portions (e.g., line segments), with each portion being associated with the current position of the one of the header sections. Similarly, the second interface element may include a plurality of second interface element portions, with each portion being associated with the reference position of the one of the header sections. As such, the position of each first interface element portion on the graphical user interface relative to the corresponding second interface element portion may provide the operator an indication of the current position of the corresponding header portion relative to its reference position.

Figure 4:
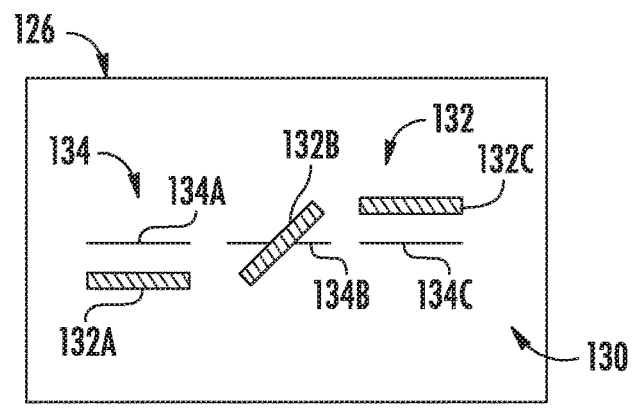
FIG. 4 illustrates an example view of a graphical user interface that may be displayed to an operator of an agricultural harvester for displaying a first interface element associated with a current position of a harvesting implement of the agricultural harvester relative to a second interface element associated with a reference position of the harvesting implement in accordance with aspects of the present subject matter.

FIG. 4 illustrates an example view of a graphical user interface 130 that may be displayed to the operator of the agricultural harvester 10 on the display device 126. As shown, the graphical user interface 130 is displaying a first interface element 132 having a first interface element portion 132A associated with the first wing section 86 of the header 34, a first interface element portion 132B associated with the center section 84 of the header 34, and a first interface element portion 134C associated with the second wing section 88 of the header 34. Moreover, the graphical user interface 130 is displaying a second interface element 134 having a second interface element portion 134A associated with the first wing section 86, a second interface element portion 134B associated with the center section 84, and a second interface element portion 134C associated with the second wing section 88. Furthermore, in the example view shown in FIG. 4, the reference position of the header 34 corresponds to an operational position in which the header sections 84, 86, 88 are generally aligned in the vertical direction 48. As such, in the example view, the first interface element portion 132A is positioned below the second interface element portion 134A, thereby indicating that the first wing section 86 is below its reference position. Furthermore, the first interface element portion 132B is rotated relative to the second interface element portion 134B, thereby indicating that the center section 84 is rotated relative to its reference position. Additionally, the first interface element portion 132C is positioned above the second interface element portion 134C, thereby indicating that the second wing section 88 is above its reference position.

Figure 5:
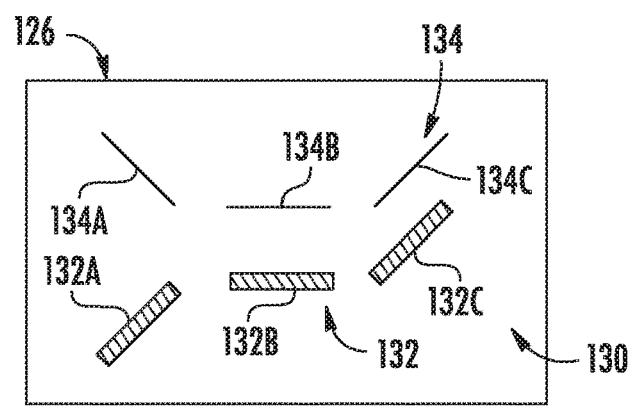
FIG. 5 illustrates another example view of a graphical user interface shown in FIG. 4, particularly illustrating the current position of the harvesting implement corresponding to an operational position and the reference position of the harvesting implement corresponding to a headlands position.

FIG. 5 illustrates another example view of the graphical user interface 130 shown in FIG. 4. As shown, the reference position of the header 34 corresponds to a headlands position which the center section 84 is lifted to a raised position relative to the field surface and the wing sections 86, 88 are pivoted upward relative to the center section 84. Moreover, in the example view, the first interface element 132 is positioned below second interface element 134, thereby indicating that the header 34 is at an operational position.

Figure 6:
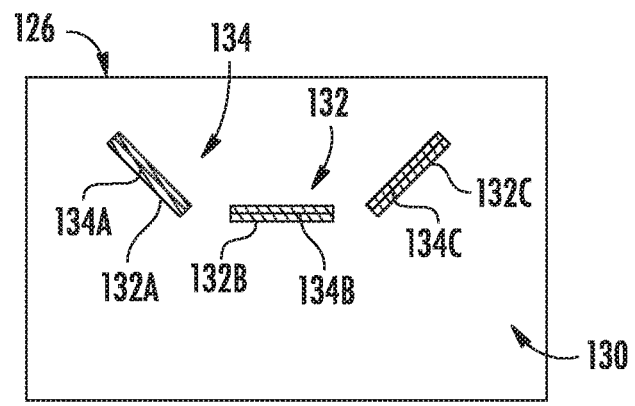
FIG. 6 illustrates yet another example view of a graphical user interface shown in FIGS. 4 and 5, particularly illustrating the current position and the reference position of the harvesting implement corresponding to the headlands position.

FIG. 6 illustrates yet another example view of the graphical user interface 130 shown in FIGS. 4 and 5. As shown, like in FIG. 5, the reference position of the header 34 corresponds to the headlands position. Furthermore, in the example view, the first interface element 132 is superimposed over the second interface element 134, indicating that the header 34 is at the headlands position.

The reference position of the header 34 identified by the second interface element may correspond to any suitable position of the header 34. For example, in the example view shown in FIG. 4, the reference position corresponds to an operational position in which the header sections 84, 86, 88 are generally aligned with each other in the vertical direction 48. In the example view shown in FIGS. 5 and 6, the reference position corresponds to a headlands position. However, the second interface element may correspond to any other operational position (e.g., an operational position in which one or more of the header sections 84, 86, 88 are oriented at oblique angles relative to each other) or non-operational (e.g., another headlands position/orientation). In one embodiment, the operator of the harvester 10 may set or select the reference position of the header 34. In such an embodiment, the operator may input such setting/selection to the input device(s) 128. The controller 120 may then receive data indicative of the setting/selection from the user interface 124 (e.g., via the communicative link 126). However, in alternative embodiments, the reference position of the header 34 may be set by the manufacturer.

Additionally, the first and second interface elements may correspond to any suitable interface elements. Specifically, in several embodiments, the first and second interface elements may correspond to lines. The line(s) of the first interface element may have a different color, texture, thickness, and/or the like to differentiate such line(s) from the line(s) of the second interface element. For example, in the example views shown in FIGS. 4-6, the first interface element corresponds to three thick lines, with each line being associated with one of the header sections 84, 86, 88. Moreover, the first interface element corresponds to thin lines (i.e., thinner than the lines forming the first interface element), with each line being associated with one of the header sections 84, 86, 88. For the purposes of clarity, in FIG. 6, the lines of the first interface element 132 are shown as hollow boxes to illustrate the first interface element 132 being superimposed over the second interface element 134. Moreover, in some embodiments, the line(s) of the one of the first or second interface elements may be solid and the line(s) of the other of the first or second interface elements may be dashed. However, in alternative embodiments, the first and/or second interface elements may correspond to numbers (e.g., percentage(s) and/or angle(s)), bars of a bar graph, and/or the like.

Referring back to FIG. 3, the controller 120 may be configured to control the operation of one or more components of the agricultural harvester 10 to adjust the current position of the header 34. As described above, the harvester 10 may include the actuators 102, 104, 108, 110, which are configured to adjust the position of the header 34 relative to the field surface (e.g., in a plane 84 (FIG. 2) defined by the vertical and transverse directions 48, 72). Moreover, as described above, the controller 120 may be configured to monitor the position of the header 34 relative to the field surface as the harvester 10 travels across the field in the direction of travel 12. In this respect, the controller 120 may be configured to control the operation of the actuators 102, 104, 108, 110 based on the monitored position of the header 34 to maintain a generally constant cutting height as the harvester 10 during the harvesting operation. For example, based on the monitored position of the header 34, the controller 120 may be configured to transmit control signals to the actuators 102, 104, 108, 110 (e.g., via the communicative link 126). Such control signals may instruct the actuators 102, 108, 110, 112 to operate in a manner that adjusts the position of the header 34 within the plane 84 to maintain a generally constant cutting height across the transverse direction 72 as the harvester 10 travels in the forward direction of travel 12.

Additionally, the controller 120 may be configured to initiate adjustment of the position of the first interface element during the harvesting operation. More specifically, when the position of the header 34 or one the header sections 84, 86, 88 is adjusted, the controller 120 may be configured to initiate an adjustment of the positioning of the first interface element relative to the second interface element within the graphical user interface to reflect the adjusted current position of the header 34. For example, as described above, in some embodiments, the reference position of the header 34 as identified by the second interface element may correspond to the headlands position. In such embodiments, when the header 34 is moved from an operational position to the headlands position, the controller 120 may be configured to initiate an adjustment of the position the first interface element 132 within the graphical user interface from a location below the second interface element to being superimposed over the second interface element.

Displaying a graphical user interface having a first interface element associated with the current position of the header 34 relative to a second interface element associated with the reference position of the header 34 may provide the operator a visual indication of the current position of the header 34. Moreover, adjusting the position of the first interface element relative to the second interface element as the position of the header 34 is adjusted relative to the field surface may further provide operator a visual indication of how the current position of the header 34 is being adjusted during the harvesting operation.

Figure 7:
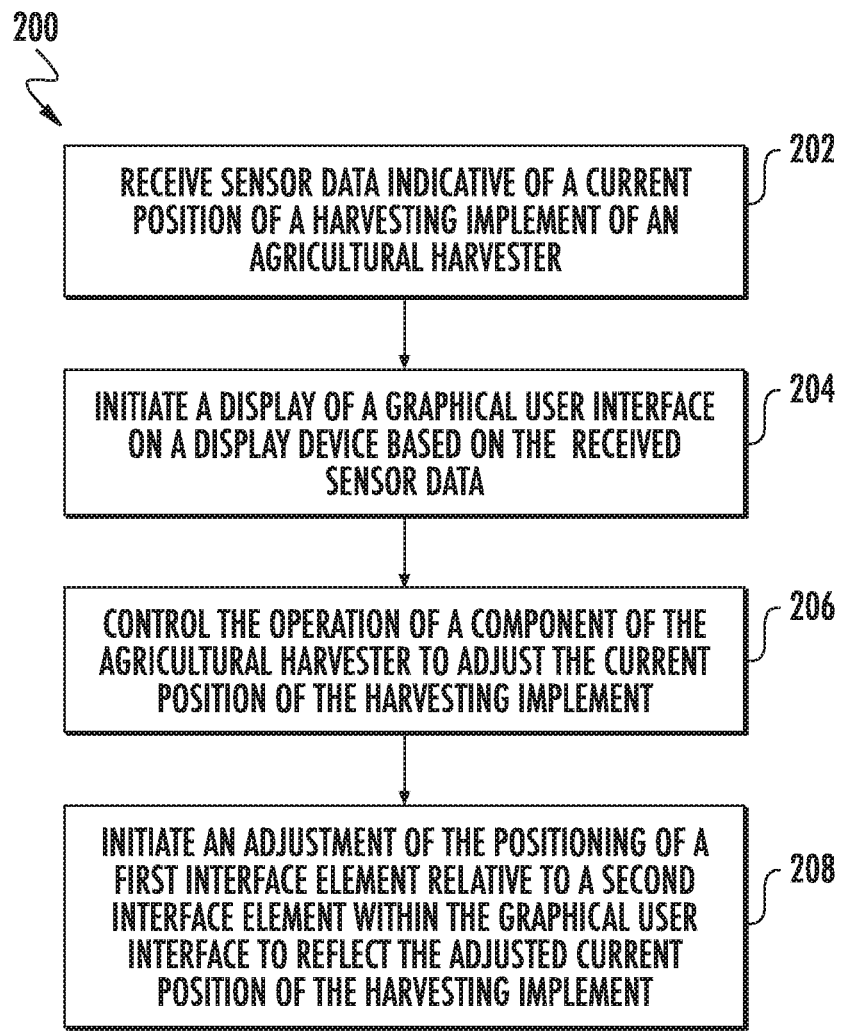
FIG. 7 illustrates a flow diagram of one embodiment of a method for controlling harvesting implement position of an agricultural harvester in accordance with aspects of the present subject matter.

Referring now to FIG. 7, a flow diagram of one embodiment of a method 200 for controlling harvesting implement position of an agricultural harvester is illustrated in accordance with aspects of the present subject matter. In general, the method 200 will be described herein with reference to the agricultural harvester 10, the header 34, and the system 100 described above with reference to FIGS. 1-6. However, it should be appreciated by those of ordinary skill in the art that the disclosed method 200 may generally be implemented with any agricultural harvesters having any suitable harvester configuration, with any harvesting implement having any suitable implement configuration, and/or within any system having any suitable system configuration. In addition, although FIG. 7 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 7, at (202), the method 200 may include receiving, with one or more computing devices, sensor data indicative of a current position of a harvesting implement. For instance, as described above, the controller 120 may be configured to receive data indicative of the current position of the header 34 from the sensor(s) 116 (e.g., via the communicative link 126).

Additionally, at (204), the method 200 may include initiating, with the one or more computing devices, a display of a graphical user interface on a display device based on the received sensor data. For instance, as described above, the controller 120 may be configured to initiate a display of a graphical user interface (e.g., the graphical user interface 130) on the display device 124 of the user interface 124 based on the received sensor data. The graphical user interface may, in turn, displaying a first interface element (e.g., the first interface element 132) associated with the current position of the header 34 relative to a second interface element (e.g., the second interface element 134) associated with a reference position of the header 34.

Moreover, as shown in FIG. 7, at (206), the method 200 may include controlling, with the one or more computing devices, an operation of a component of the agricultural harvester to adjust the current position of the harvesting implement. For instance, as described above, the controller 120 may be configured to control the operation of the lift actuator(s) 102, the tilt actuators 104, and/or the pivot actuators 108, 110 of the harvester 10 to adjust the current position of the header 34.

Furthermore, at (208), the method 200 may include initiating, with the one or more computing devices, an adjustment of the positioning of a first interface element relative to a second interface element within the graphical user interface to reflect the adjusted current position of the harvesting implement. For instance, as described above, the controller 120 may be configured to initiate an adjustment of the positioning of the first interface element (e.g., the first interface element 132) relative to a second interface element (e.g., the second interface element 134) within the graphical user interface (e.g., the graphical user interface 130) to reflect the adjusted current position of the header 34.

It is to be understood that the steps of the method 200 are performed by the controller 120 upon loading and executing software code or instructions which are tangibly stored on a tangible computer readable medium, such as on a magnetic medium, e.g., a computer hard drive, an optical medium, e.g., an optical disc, solid-state memory, e.g., flash memory, or other storage media known in the art. Thus, any of the functionality performed by the controller 120 described herein, such as the method 200, is implemented in software code or instructions which are tangibly stored on a tangible computer readable medium. The controller 120 loads the software code or instructions via a direct interface with the computer readable medium or via a wired and/or wireless network. Upon loading and executing such software code or instructions by the controller 120, the controller 120 may perform any of the functionality of the controller 120 described herein, including any steps of the method 200 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

The invention claimed is:

1. A system for controlling harvesting implement position of an agricultural harvester, the system comprising:
   a harvesting implement configured to be coupled to the agricultural harvester to permit adjustment of a current position of the harvesting implement relative to a field surface, the harvesting implement including a first implement section and a second implement section;
   a sensor configured to capture data indicative of the current position of the harvesting implement relative to the field surface;
   a display device; and
   a controller communicatively coupled to the sensor and the display device, the controller configured to:
      monitor the current position of the harvesting implement based on the data captured by the sensor; and
      initiate display of a graphical user interface on the display device, the graphical user interface displaying a first interface element including a first line associated with a current position of the first implement section and a second line associated with a current position of the second implement section, the graphical user interface further displaying a second interface element including a first line associated with a reference position of the first implement section and a second line associated with a reference position of the second implement section such the first line of the first interface element is superimposed over the first line of the second interface element and the second line of the first interface element is superimposed over the second line of the second interface element.

2. The system of claim 1, wherein the harvesting implement extends in a transverse direction between a first side of the harvesting implement and a second side of the harvesting implement and in a vertical direction between a bottom end of the harvesting implement and a top end of the harvesting implement, the harvesting implement configured to be coupled to the agricultural harvester to permit adjustment of the current position of the harvesting implement in a plane defined by the transverse and vertical directions.

3. The system of claim 2, wherein the first implement section is pivotably coupled to the second implement section such that a position of the first implement section in the plane is independently adjustable relative to a position of the second implement section in the plane.

4. The system of claim 3, wherein the first line of the first interface element is associated with the current position of the first implement section within the plane and the second line of the first interface element is associated with the current position of the second implement section within the plane.

5. The system of claim 3, wherein the sensor corresponds to a first sensor installed on the first implement section and configured to capture data indicative of a distance between the first implement section and the field surface in the vertical direction, the system further comprising:
   a second sensor installed on the second implement section and configured to capture data indicative of a distance between the second implement section and the field surface in the vertical direction.

6. The system of claim 1, wherein the controller is configured to receive an input associated with the reference position of the harvesting implement from an operator of the agricultural harvester.

7. The system of claim 1, wherein the reference position comprises a headlands position of the harvesting implement.

8. A method for controlling harvesting implement position of an agricultural harvester, the agricultural harvester including a harvesting implement configured to be coupled to the agricultural harvester to permit adjustment of a current position of the harvesting implement relative to a field surface, the method comprising:
   receiving, with one or more computing devices, sensor data indicative of the current position of the harvesting implement;
   initiating, with the one or more computing devices, a display of a graphical user interface on a display device based on the received sensor data, the graphical user interface displaying a first interface element including a first line associated with a current position of the first implement section and a second line associated with a current position of the second implement section, the graphical user interface further displaying a second interface element including a first line associated with a reference position of the first implement section and a second line associated with a reference position of the second implement section such the first line of the first interface element is superimposed over the first line of the second interface element and the second line of the first interface element is superimposed over the second line of the second interface element;

controlling, with the one or more computing devices, an operation of a component of the agricultural harvester to adjust the current position of the harvesting implement; and initiating, with the one or more computing devices, an adjustment of the positioning of the first interface element relative to the second interface element within the graphical user interface to reflect the adjusted current position of the harvesting implement.

9. The method of claim 8, wherein the harvesting implement extends in a transverse direction between a first side of the harvesting implement and a second side of the harvesting implement and in a vertical direction between a bottom end of the harvesting implement and a top end of the harvesting implement, the harvesting implement configured to be coupled to the agricultural harvester to permit adjustment of the current position of the harvesting implement in a plane defined by the transverse and vertical directions.

10. The method of claim 9, wherein the first implement section is pivotably coupled to the second implement section such that a position of the first implement section in the plane is independently adjustable relative to a position of the second implement section in the plane.

11. The method of claim 10, wherein the first line of the first interface element is associated with the current position of the first implement section within the plane and the second line of the first interface element is associated with the current position of the second implement section within the plane.

12. The method of claim 10, wherein receiving sensor data comprises receiving, within the one or more computing devices, sensor data indicative of a distance between the first implement section and the field surface in the vertical direction and a distance between the second implement section and the field surface in the vertical direction.

13. The method of claim 8, further comprising:

receiving, with the one or more computing devices, an input associated with the reference position of the harvesting implement from an operator of the agricultural harvester.

14. The method of claim 8, wherein the reference position comprises a headlands position of the harvesting implement.

* * * * *